US006413617B1

(12) United States Patent
Schlier

(10) Patent No.: US 6,413,617 B1
(45) Date of Patent: Jul. 2, 2002

(54) INFORMATIONAL CARD

(76) Inventor: David G. Schlier, 21 Apple La., Fleetwood, PA (US) 19522

( * ) Notice: Subject to any disclaimer, the term of this patent is extended or adjusted under 35 U.S.C. 154(b) by 0 days.

(21) Appl. No.: 09/300,992

(22) Filed: Apr. 28, 1999

(51) Int. Cl.$^7$ .......................... B32B 27/14; B32B 3/00

(52) U.S. Cl. ................ 428/195; 40/124.01; 40/124.09; 40/124.11; 40/382; 40/534

(58) Field of Search ........................ 40/124.01, 124.09, 40/124.11, 534, 382; 428/195

(56) References Cited

U.S. PATENT DOCUMENTS

| | | | | |
|---|---|---|---|---|
| 2,547,359 A | | 4/1951 | Bacharach | |
| 4,070,778 A | | 1/1978 | Mahler et al. | |
| 4,109,851 A | | 8/1978 | Goates | |
| 4,200,222 A | | 4/1980 | Feuer | |
| 4,380,128 A | | 4/1983 | Ichikawa | |
| 4,439,202 A | | 3/1984 | Sernaker | |
| 4,439,941 A | | 4/1984 | Halperin | |
| 4,510,189 A | * | 4/1985 | Girard | 428/19 |
| 4,622,768 A | * | 11/1986 | Moreau | 40/124.1 |
| 4,654,044 A | | 3/1987 | Gilardone, Jr. | |
| 5,217,286 A | * | 6/1993 | Ming-ho | 362/31 |
| 5,284,365 A | | 2/1994 | Stuart | |
| 5,951,057 A | * | 9/1999 | Spector | 283/117 |

* cited by examiner

*Primary Examiner*—Bruce H. Hess
*Assistant Examiner*—B. Shewareged
(74) *Attorney, Agent, or Firm*—Charles A Wilkinson

(57) ABSTRACT

An informational card is disclosed incorporating a plurality of separable, functional articles that are removable from such card and capable of being applied to a separate article or articles, either independently of, or in conjunction with each other. The removable articles, such as a patch, embroidered emblem, heat transfer or the like, may be removed from the card and adhesively or heat applied to a separate article, with indicia that bears some relation to the information conveyed on the card. One of the removable articles has a cutout to accommodate the placement of a first removable article during the conjunctive application of a series of removable articles to an article separate and distinct from the informational card. The informational card of the present invention functions as a keepsake about a particular topic, and is equipped with removable articles that enhance the value of the card by providing the owner with the ability to create additional keepsakes capable of being worn or otherwise displayed separate and apart from the informational card.

28 Claims, 13 Drawing Sheets

100
105
125
400
500
510
900
PANSIES
TEXT

INFORMATIONAL CARD

BACKGROUND OF THE INVENTION

1. Field of the Invention

This invention relates to information cards generally, and more specifically to a card having a plurality of separable elements or features, such as an embroidered patch and a heat transfer, that may each be removed from such card and applied to a consumer article either independently of, or in conjunction with each other.

2. Preliminary Discussion

Keepsakes, memorabilia, souvenirs and the like serve important and useful functions in our society. Not only do they convey information and memorabilia concerning a particular experience, but they allow an individual to take and share such experience with their friends and family.

For example, an individual who visits a city attraction, such as a zoo or the like, for the first time might purchase a hat adorned with the individual's favorite animal and the name of the zoo. In this example, the markings on such hat, and more particularly the name of the zoo, transform the function of the hat from one of complete utility to an ongoing remembrance of the individual's visit. Such markings also serve an important marketing purpose with respect to the direct purchaser, but they also serve as a general marketing medium, i.e. it is anticipated that others seeing the source indicator might also desire to visit or frequent such source.

In general, whether a business is a pure "tourist trap," such as Disney World® or the Statue of Liberty, or whether a business is a tourist trap by virtue of its placement in a particular city or location, such as the Washington Monument and the Smithsonian Museum, or whether the business is a purely local concern trying to attract customers, such as the sandwich shop down the street, the more people that frequent a particular location, the greater the benefit to the target business and the local economy. Consequently, businesses spend huge sums trying to attract customers or patrons to frequent their establishments.

Once customers or patrons are "through the doors" so to speak, they are immediately enticed to spend money. Everyone knows that tourists, in particular, don't like to go away empty handed. But even more importantly, tourists like to purchase items that have lasting value. For example, a photograph, magnet, button or an informational booklet describing or displaying a particular experience has lasting value, and can usually be enjoyed by future generations. An article of clothing displaying an aspect of a particular memorable experience tends to have a lesser amount of lasting value, since clothing tends to wear out with age and excessive use, but does in fact have great exhibition value, especially when it is important for the owner to convey that he or she has taken part in a particular experience. Patrons of rock concerts, professional sports games and plays that purchase licensed or sanctioned or authorized clothing items are perfect examples, and are also usually walking advertisements for such events, while university and college attendees and parents of the same frequently will wear items adorned with their college name or logo to show their school spirit or pride in being connected with such an institution.

Memorabilia usually come in one of two forms. The most popular type of memorabilia is the utilitarian or functional type, such as a shirt, button, magnet or the like. These items provide the patron with instant, expressive gratification as discussed above. The other type of memorabilia is the non-utilitarian or non-functional type, such as a booklet of information about a particular experience. Souvenir-type items in the form of booklets or other sources of audio, visual or literary-type information tend to have lasting value to the purchaser, and are usually intended to serve as a more complete reference commemorating a particular experience.

It is rare, however, that prospective patrons or customers are provided with the ability to purchase an item or souvenir that is both functional and non-functional as described above. The item of the present invention is a unique product designed to convey information about a particular topic, i.e. in the form of a non-functional card-type medium, along with the provision of a plurality of functional keepsakes related to such topic and integrated into such product. The functional articles provided along with the information card may be separated from the information card and applied to another object to create an additional keepsake incorporating such functional articles. More specifically, the assembly of the present invention is comprised of an informational card having a first article, preferably a patch, embroidered emblem or the like, removably attached thereto and capable of being applied to a separate object, and a second article, preferably an adhesively applied heat transfer, removably attached thereto and capable of being applied to the same separate object either independently of, or in conjunction with the first removable article. Both removable articles bear indicia that are preferably related in some fashion to the material conveyed on the informational card. Therefore, the owner of the informational card of the present invention obtains the lasting benefit and value of having an item of written information about a particular subject or experience, and the further ability to create independent functional item or items related to such subject or experience.

3. Description of Related Art

It is known to provide functional items in packages or as assemblies, with such functional items being related to information provided in or on such packages or assemblies. For example, a pizzeria that delivers to a local area might distribute cards with their menu printed thereon, and such cards might also have a magnet adhesively attached thereto with the name and phone number of the pizzeria printed on the face of such magnet. In this example, the functional aspect of the information card is the menu, while the non-functional aspect is the magnet that would presumably be attached to a prospective customer's refrigerator for easy access to the information printed thereon. While the magnet is essentially non-functional with respect to the business except with respect to whatever advertising information it may embody, it is at least potentially functional for the customer, which is the reason the customer hopefully retains it in the modern throwaway society. Furthermore, the magnet serves as an immediate reference for dialing the pizzeria and possibly ordering items that don't require the perusal of the lengthier menu, while the menu serves as a more complete reference for perusing the totality of options.

Other methods of conveying information and functional articles in a single package are known in the greeting card art. For example, U.S. Pat. No. 2,547,359 to R. Bacharach discloses a combination greeting card and framed picture, with the picture shown through a cutout in the front of the card. The picture is removable and capable of being displayed in one's home, and thus provides the recipient with an essentially functional keepsake, while the card serves as a medium to convey a written message, i.e. non-functional information.

U.S. Pat. No. 4,070,778 issued to H. H. Mahler et al. discloses a combination greeting/post card with a wax-like adhesive applied to the back surface of the card for display-like attachment to a wall or the like. The front sheet of the card may be separated from the back and mailed as a postcard, leaving the back sheet adhered to the wall. The adhesive surface transforms the non-functional back part of the card into a functional display piece, while the greeting or message printed thereon is retained as a keepsake or mailed as a postcard.

U.S. Pat. No. 4,109,851 issued to D. T. Goates discloses a thermocontractive plastic plate adhesively applied to a postcard for subsequent thermal transformation into a novelty item. The card with the plate attached is placed in an oven and heated until the adhesive between the plate and the card dissolves and the plate shrinks into a novelty item. The Goates reference illustrates the application of a single, distinct, removable article from an information card, which article is transformed into a stand-alone novelty item.

U.S. Pat. No. 4,200,222 issued to E. P. Feuer discloses a removable decal with a removable backing sheet that is viewed through a window in the front sheet of a greeting card. The decal may be removed from the card and applied to another surface, thereby enabling the user to create a single, functional item from the removable decal. Similarly, U.S. Pat. No. 4,439,941 issued to E. Halperin discloses a greeting card with a removable and reusable insert in the form of a multicolored embroidered emblem that is adhesively or heat-applied to a separate article.

U.S. Pat. No. 5,284,365 issued to J. H. Stuart discloses a greeting card with a removable message insert of various embodiments. The removable insert is disclosed as being adhesively or magnetically attachable to a surface, or capable of being hung like a holiday ornament.

None of the prior art references of which the inventor is presently aware discloses an informational-type card assembly designed to convey information about a particular topic along with the provision of a plurality of functional keepsakes related to such topic and integrated into such product, with such plurality of functional articles capable of being applied to a separate object either independently of, or in conjunction with each other.

More specifically, none of the prior art references disclose an informational card having both a removable heat transfer and a removable emblem, patch or the like, each of which can be applied to separate articles independently of each other, or to the same article in an overlapping fashion, such that the combination of the applied articles on a single surface creates a homogeneous image consistent with, or distinct from an image shown on the informational card.

OBJECTS OF THE INVENTION

It is an object of the present invention, therefore, to provide an informational card having a plurality of separable elements or features that may each be removed from such card and applied to a separate article either independently of, or in conjunction with each other.

It is a further object of the present invention to provide an informational card having both utilitarian and non-functional aspects in a single assembly.

It is a still further object of the present invention to provide an informational card having a removable heat transfer and a removable emblem, patch or the like, each of which can be applied to separate articles independently of each other, or to the same article in an overlapping fashion.

It is a still further object of the present invention to provide an informational card having a removable heat transfer and a removable emblem, patch or the like, which when applied to the same article in an overlapping fashion create a homogeneous image.

It is a still further object of the present invention to provide an informational card having a removable heat transfer and a removable emblem, patch or the like, which when applied to the same article in an overlapping fashion create a homogeneous image consistent with, or distinct from an image shown on the informational card.

It is a still further object of the present invention to provide a folding informational card having a removable emblem positioned along an inside surface of the card that is viewable from the front surface of the card.

It is a still further object of the present invention to provide a folding informational card having a removable patch or emblem positioned along an inside surface of the card that is viewable from the front surface of the card and a removable heat transfer removably positioned along the back surface of the card.

It is a still further object of the present invention to provide an informational card having a removable heat transfer that is removably positioned along the back surface of the card.

It is a still further object of the present invention to provide an informational card having a removable heat transfer that is removably positioned along the back of the card and consists of the same image as viewed from the front of the card.

It is a still further object of the present invention to provide a folding informational card having a removable patch or emblem positioned along an inside surface of the card that is viewable from the front surface of the card and a removable heat transfer removably positioned along the back surface of the card that is also viewable from the front surface of the card.

It is a still further object of the present invention to provide an informational card having a removable heat transfer removably positioned along the back surface of the card and which is applied to a separate and distinct article via the direct application of heat through the information card.

It is a still further object of the present invention to provide an informational card having a removable emblem, patch or the like positioned along a front surface of the card, and a removable heat transfer positioned along the back surface of the card, that are both applied to a separate and distinct article together via the direct application of heat through the front surface of the card.

Still other objects and advantages of the invention will become clear upon review of the following detailed description in conjunction with the appended drawings.

SUMMARY OF THE INVENTION

An informational card incorporating a plurality of separable, functional articles that are removable from such card and capable of being applied to a separate article or articles, either independently of, or in conjunction with each other. More specifically, the informational card of the invention comprises a removable patch, embroidered emblem or the like, that may be adhesively or heat applied to a separate article, with indicia that bears some relation to the information conveyed on the card. A second removable article, preferably in the form of a heat transfer or the like, is also adhesively applied to the back of the information card, and such heat transfer or the like may be transferred to a separate article via the direct application of heat through the surface of the informational card. Means are provided in the second removable article to accommodate the placement or positioning of the first removable article during the conjunctive application of both removable articles to an article separate and distinct from the informational card.

The informational card of the present invention is designed to function as a keepsake, item of memorabilia, souvenir or the like, conveying information about a particular topic or item of interest. The informational card of the invention is also equipped with removable functional articles that enhance the value of the card by providing the owner with the ability to create additional keepsakes capable of being worn or otherwise displayed separate and apart from the informational card.

DESCRIPTION OF THE PREFERRED EMBODIMENTS

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

Figure 3:
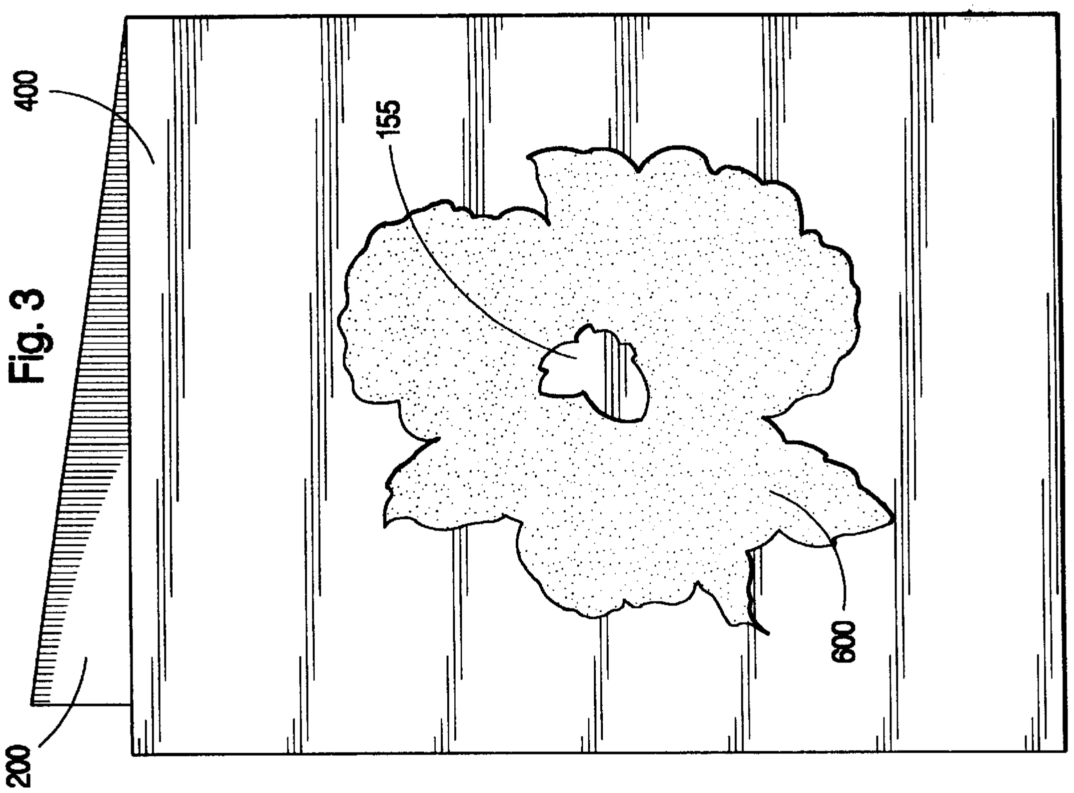
FIG. 3 is a front view of the fourth or back surface of the information card of the present invention.
Figure 1:
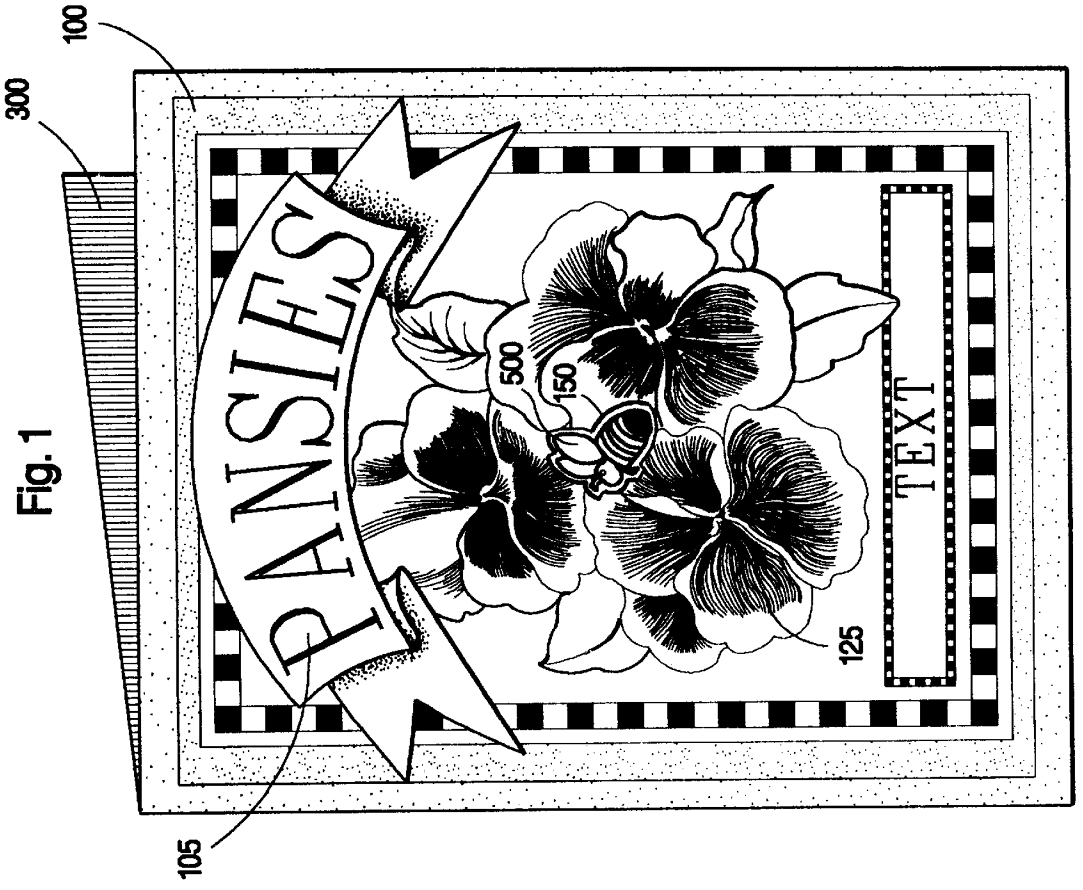
FIG. 1 is a front view of the first surface or cover of the information card of the present invention.
Figure 2:
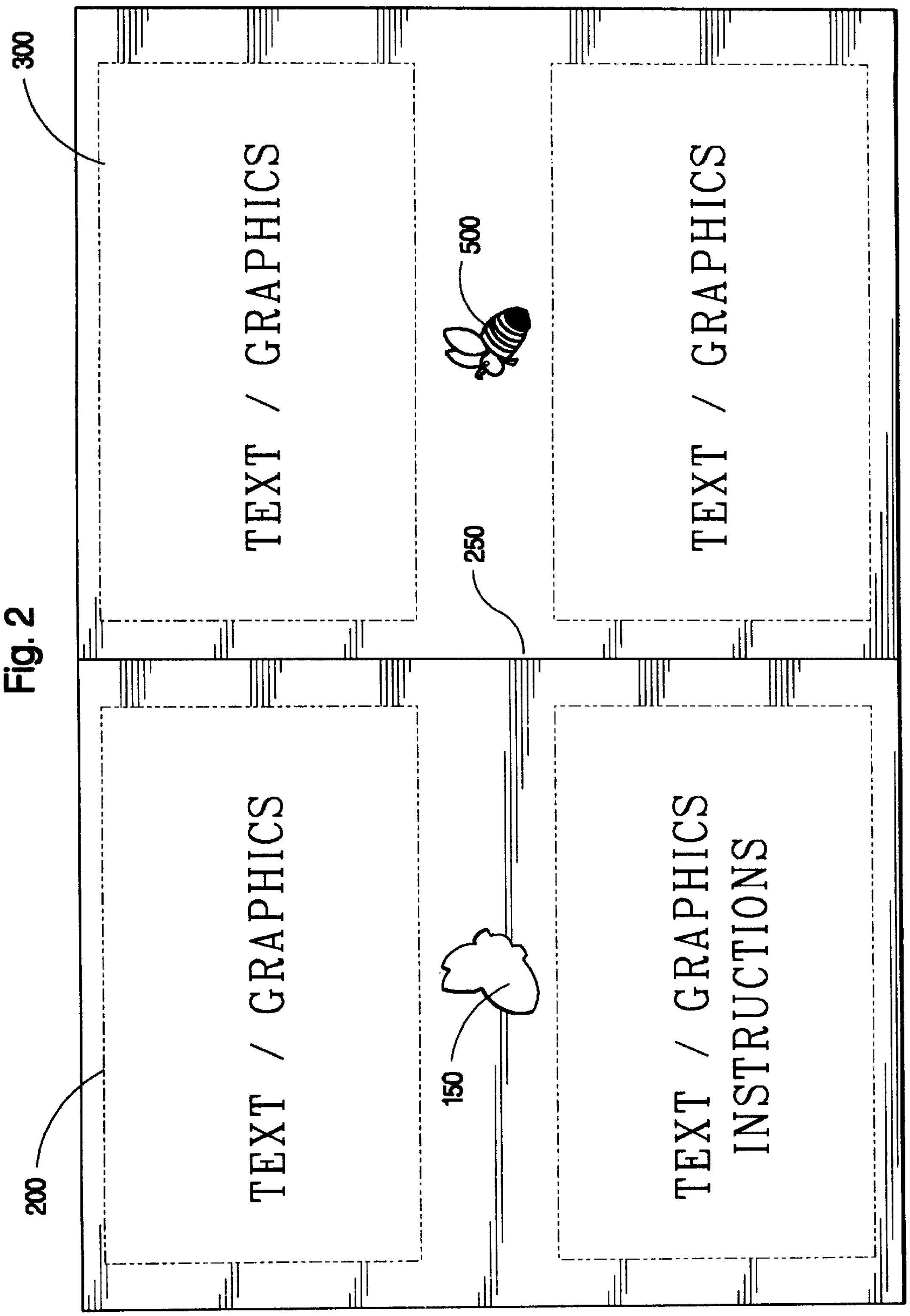
FIG. 2 is a front view of the second and third surfaces, or inside surfaces, of the information card of the present invention.

FIGS. 1 through 3 are front views of the surfaces of a folded information card of the present invention, with FIG. 1 illustrating the first surface 100 or front cover, FIG. 2 illustrating the second and third surfaces 200 and 300 respectively or the surfaces that are viewed once the card is opened, and FIG. 3 illustrating the fourth surface 400 or the back cover with the second surface 200 shown partially therebehind, with the first and second opposing surfaces 100 and 200 forming a first leaf of the card and the second and third opposing surfaces 300 and 400 forming a second leaf of the card. While the card of the present invention will be shown and described in some cases as a folded card, generally consisting of four separate surfaces, it will be understood that the elements or aspects of the present invention can preferably be applied to a card having at least two surfaces, and up to "x" number of surfaces as the case may be, as long as the card is able to accommodate the removable articles of the invention to be described herein. Furthermore, while the informational card of FIGS. 1 through 3 is shown with the fold or spine 250, such fold or spine 250 occurring between the second and third surfaces 200 and 300, aligned in a generally vertical orientation, it will be clearly understood that such fold or spine could also be aligned in a generally horizontal orientation as is commonly seen in the marketplace. In other words, the card of FIGS. 1 through 3 could also be rotated ninety degrees and be operative in the same manner as described herein.

FIG. 1 is a front view of the first surface 100 of the card of the invention with the card in a closed position. One viewing the front surface 100 of the information card of the invention would immediately notice certain desirable aspects of the card. First, there will usually be some identifying indicia 105 noted thereon representative of a particular experience or summarizing such experience. Such indicia 105 may, for example, be the name of a particular location, its logo or design or the like. Or such identifying indicia may be the title of a particular theme, as specifically shown in FIG. 1 with the title "PANSIES." It will be appreciated that such indicia may also be textual or pictorial in nature. The first surface 100 also generally comprises an orifice or cutout 150 of a particular dimension, such that a first article 500, shown here in the form of a bumble bee, removably attached to the third surface 300 (see FIG. 2) of the card will be visible through such orifice 150. Surrounding such orifice or cutout 150 on the first surface 100 and around the first removable article 500 is a further design 125, shown here as a grouping of pansies, which design or image 125 matches the design or image on the second article 600 (see FIG. 3, and FIG. 4 to be discussed), such second article 600 being removably attachable to the fourth surface 400. Consequently, when both articles 500 and 600 are removed from the information card in a manner to be described herein, and applied to a separate object or article with the image of the first article 500 being surround by the image of the second article 600, the combined image on such separate object will be identical to the image viewed by looking at the first surface 100 of the card of the invention when the card is in the closed position.

The first removable article 500 is either two dimensional, such as a sticker or a decal, or more preferably three dimensional, such as a patch of the embroidered variety or non-embroidered variety or some other type of three dimensional object. While stickers and decals are literally three dimensional, it will be understood for purposes of explanation that the distinction between a sticker and patch is an actual noticeable depth dimension that creates a unique impression for the viewer, and is also often associated with a unique feel to the touch. For purposes of illustration, the first article 500, again shown for purposes of illustration as a bumble bee, will be described as an embroidered patch, or just a patch, which is clearly an article that can be considered as having a noticeable depth dimension or is, in general, "raised" from a particular surface. A patch is useful to illustrate some of the more desirable features of the invention because a patch, which has a depth dimension, creates a unique sensation when touched, and tends to look nicer when applied to articles of clothing or the like (as opposed to a mere sticker or decal). A three-dimensional patch, when applied to the third surface 300 of the card of the invention, will preferably show through the second surface 200 and be viewable along with the first surface 100 when the card is in the closed position. The patch 500 would be equipped with a combination heat seal and pressure sensitive back, allowing the patch to be heat applied to a textile article, such as to clothing for example, or pressed on via the pressure sensitive adhesive to virtually any other article or surface. While the patch 500 is preferably equipped with a combination heat seal and pressure sensitive back, it could also be equipped with either a pressure sensitive back only, or a heat seal only, or a combination surface preferably.

As shown in FIGS. 1 and 2, the cutout 150 extends between the first and second surfaces 100 and 200 respectively, and the outline dimension of the cutout 150 is designed to accommodate the dimension of the first article 500, such that, as noted above, the article 500 might preferably extend through the cutout 150 and form part of the front surface view when the card is in the closed position and viewed in this manner. Of course, the cutout 150 could be dimensioned so that the article 500 does not extend through such cutout, but is instead merely exposed through such cutout, in which case its image will enhance the overall view of the front surface 100 as opposed to both its image and its depth, if any. If the first article 500 was a patch, then such patch would be exposed through the cutout 150 when the card is in the closed position, creating the impression that the patch 500 forms part of the first surface 100, even though it would temporarily reside on the third surface 300 as shown in the embodiment of the invention in FIGS. 1 through 3.

The second article 600 (see FIG. 3) removably attachable to the fourth surface 400 is also either two dimensional, such as a sticker or a decal, or three dimensional, such as a patch of the embroidered variety or non-embroidered variety or some other type of three dimensional object. For purposes of illustration, the second article 600 will be preferably in the form of an image-bearing heat transfer of the t-shirt variety, i.e. for transfer to t-shirts or the like, which does not have as extensive a depth dimension as a patch, but does have more of a depth dimension than a sticker or a decal. The second article 600 in the form of a heat transfer or the like would be equipped both with an adhesive or temporary adhesive first surface mountable to the fourth surface 400 of the card, and preferably a combination heat seal and pressure sensitive surface on the other side, or second side, of the transfer, allowing the transfer to be temporarily pressed onto a textile article and positioned thereon prior to the more permanent heat application of the transfer to such article of clothing or the like. Such application of the second article 600 to an article of clothing or the like would preferably occur by the direct application of heat, by an iron or other heat press or the like, applied to the third surface 300 of the card, which heat would transfer through such third surface 300 to the fourth surface 400, thereby dissolving the temporary adhesive securing first side of the second article 600 to the fourth surface 400 and perfecting the heat application of the second article 600 to an article of clothing or the like.

It will be understood that the first side of the article 600 will be the finished side, which will be ultimately viewable on the clothing or the like, and the second side may be unfinished. However, the second side may also be finished or decorated to form a more complete back to the card of the invention. Furthermore, in a more modern type of transfer, the transfer attached to the rear of the card or the fourth surface 400 will have merely a color transferable second surface that will, upon the application of heat, be transferred directly to the article of clothing, leaving the transfer itself still attached to the back of the card. In such case, the separate transfer will be attached to the back of the card or surface 600 by permanent adhesive. In a still further type of arrangement, the back of the card will itself be the transfer, the image and color of which may be transferred directly to the clothing surface by the application of heat from an iron or the like.

Figure 3A:
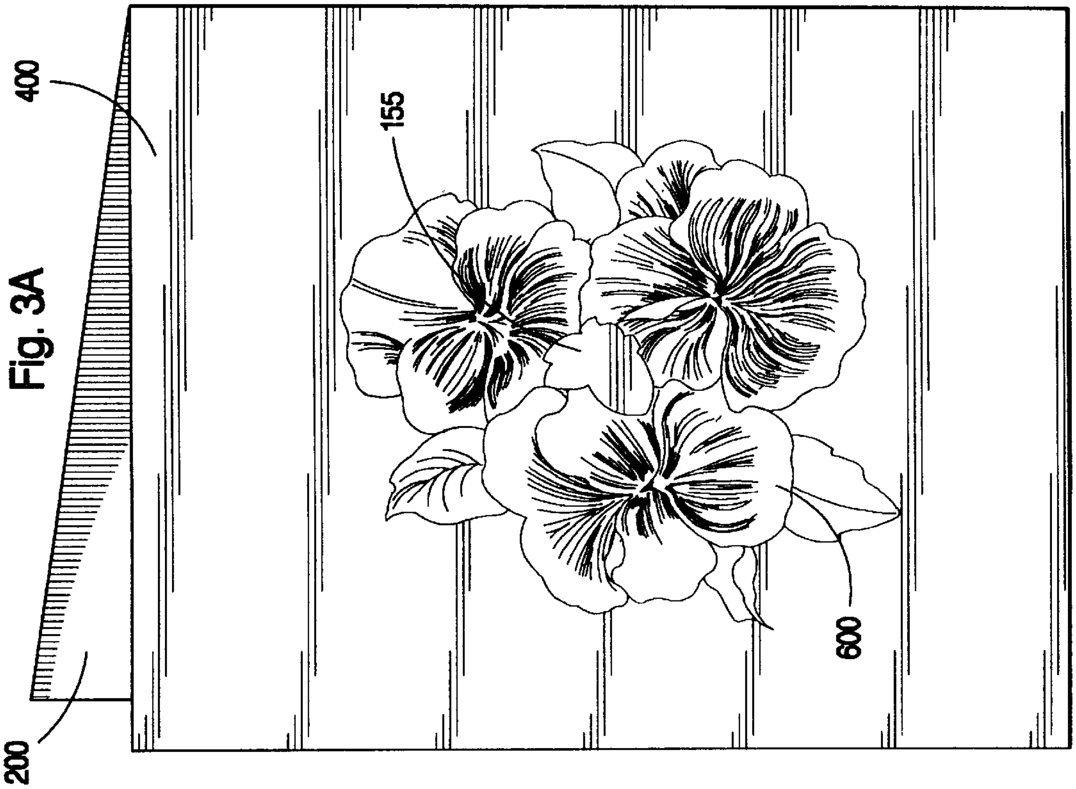
FIG. 3A is a front view of the fourth or back surface showing an alternative embodiment of the second removable article.

As shown in FIG. 3, the second article 600 preferably has a cutout 155, similar to the cutout 150 present between the first and second surfaces 100 and 200, and bears an image that is preferably, although not necessarily, identical to the design or image 125 present on the first surface 100 of the card. If desired, the second article 600 might not have a cutout 155 but might instead have a continuation of the design or image 125 so that the second article, when applied to a separate object alone, i.e. without the conjunctive application of the first article 500, does not appear discontinuous or with a cutout in the central portion of the article 600. Since the second article 600 is preferably in the nature of a heat transfer or the like, the image or design on such second article 600 is usually not viewable by viewing the fourth surface 400, since the design side of the second article would be initially, temporarily adhesively attached to the fourth surface 400 as shown. Since the second article 600 may, however, as explained above, be merely a heat transferrable pigment image on the back of the card or fourth surface 400, the second article may be viewable on the back of the card as a mirror image of what will be transferred ultimately to a clothing article or the like (see FIG. 3A).

The operation of the preferred embodiment of the card of the present invention is as follows. A recipient of the card would view the first surface 100 and notice a composite image or design comprised of the design or image 125 surrounding a first removable article 500, such first removable article 500 appearing or peeking through a cutout 150 in the first surface 500. Other indicia 105 on the first surface 100 would summarize or introduce the subject matter of the card to the recipient. By viewing the first surface 100 or cover of the card, the recipient is able to touch or feel the surface texture of the first article 500. Another highly desirable feature of the cover image is that the cover of the card illustrates the composite design of the two articles, namely articles 500 and 600, as such composite design might appear on a separate article, such as a shirt for example. Since the design or image of the second article 600 is preferably identical to the design or image 125 on the first surface 100, and since the second article 600 comprises a cutout 155 that is preferably identical to the cutout 150 in the first surface 100 and/or is preferably identical to the outline dimension of the first article 500, the recipient is able to initially view the composite image or design of both articles 500 and 600 as if such articles were removed from the card of the invention and applied to a separate article, such as a shirt, by the recipient. In other words, the recipient is able to view the card and realize the nature of the design that can be extracted from the articles attached to the card and applied to a separate article such as a shirt or the like. The recipient or purchaser of a card is therefore able to select a particular design or image that he or she would wish to apply to a separate article, such as a shirt, by merely perusing the front covers of the available cards.

After the purchaser or recipient opens the card of the invention, he or she will immediately notice the first article 500 temporarily and preferably attached to the third surface 300 of the card. The second and third surfaces 200 and 300 will preferably be enhanced with further indicia, i.e. text, graphics or a combination of the two, or information about the particular experience illustrated by such card or about the topic of the card, and may even include written or pictorial (or both) instructions on how a recipient or user may fully utilize the removable articles attached to such card. Since such first article 500 is preferably equipped with a combination heat seal and pressure sensitive back, the article 500 may be removed from the surface 300 and pressed onto a separate object (see FIG. 7), or it may be temporarily applied to a garment via the pressure sensitive back and then heat applied in a more permanent fashion to such garment for a lasting effect (again, see FIG. 7). The design or image of the first article 500 is preferably, although not necessarily, printed on the surface of the card underneath the removably attached first article 500, such that the design or image of the first article 500 is retained as part of the card once the actual first article 500 is removed from the card. The cutout 150 may also preferably, but by no means necessarily, be provided with a non-opaque covering that may also extend slightly forward to protect the article 500 while the card is displayed on a rack in a vending establishment. This would be particularly useful if the card of the invention was not vended in its own wrapping or other package-type container.

Instructions will also preferably be provided on one of the surfaces of the card or in an insert-type sheet vended or otherwise provided with the card concerning the application of the second article 600 to a garment or the like. The second article 600, as described above, is preferably a heat transfer, which is generally heat applied to a garment through the forceful application of heat via an iron or other type of heat press. The card of the invention provides the owner of the card with the necessary means to transmit the application of heat through the article 600 and onto a garment or the like. The surfaces of the card are impervious to the direct application of heat from an iron or the like, such that the second article 600 may be heat applied to a garment through the application of heat to the surface of the card directly upon the surface on which the article 600 is temporarily adhesively applied. In other words, one must merely position the card such that the second article 600, currently adhesively secured to the fourth surface 400, is in the proper location against a garment, and then apply heat directly to the third surface 300 (see FIGS. 2 and 3), which heat will be transmitted though the third and fourth surfaces 300 and 400 and to the second article 600, which heat releases the article 600 from its temporary adhesive bond with the fourth surface 600 and activates the heat seal that creates a more permanent-type affixation to a garment or the like. Alternatively, as explained above and shown in FIG. 3A, merely the pigment from the transfer, which in this case may be the fourth surface or sheet itself, may be released by the heat and applied to an adjacent surface.

It should be noted that another desirable feature of the card of the present invention, and more particularly the nature of the removable articles attached to the card, is the manner in which such articles may be removed and applied to a separate object either independently of, or in conjunction with each other on such separate object. Since the cutout 155 in the second article 600 is specifically designed to accommodate the dimensions of the first article 500, it will be understood that a highly desirable feature of the card of the invention will be the conjunctive heat application of both articles 500 and 600 to a separate object, with such first article 500 fitting nicely within the cutout 155 of the second article 600, such that a composite image may be created on such separate object that matches the image viewed on the cover of the card (see FIG. 1). In other words, the first article 500 can be removed from the surface of the card of the invention and adhesively applied to a garment or the like, and then the second article 600 can be positioned over the first article 600 such that the first article 500 is positioned within the orifice or cutout 155 of the second article, after which both articles can be simultaneously heat applied to a garment or the like, resulting in a composite image on such garment that is consistent with the image shown on the cover of the card when the card is in the closed position. Normally, if the first article 500 is an embroidered patch, such article 500 must be separated or protected by a separate sheet or covering from the direct application of heat from an iron or the like. However, the use of the card surface 300 (in FIGS. 2 and 3) to simultaneously and directly apply heat to the first and second articles, now located adjacent the fourth surface 400, protects both articles from the hot surface of the iron or the like, and makes an additional sheet separate from the card itself unnecessary. Consequently, the information card of the invention acts as a protective surface during the heat application of the articles 500 and 600 to a separate garment surface or the like.

It should be noted that the card surfaces are constructed in such a manner that the removal of the articles 500 and 600 through manual means, heat means or otherwise, does not destroy the integrity of the card surfaces or the indicia noted thereon, thus allowing the informational card of the invention to be used as a keepsake, souvenir or collectible, both with and without the removably attached articles attached thereto.

Figure 4:
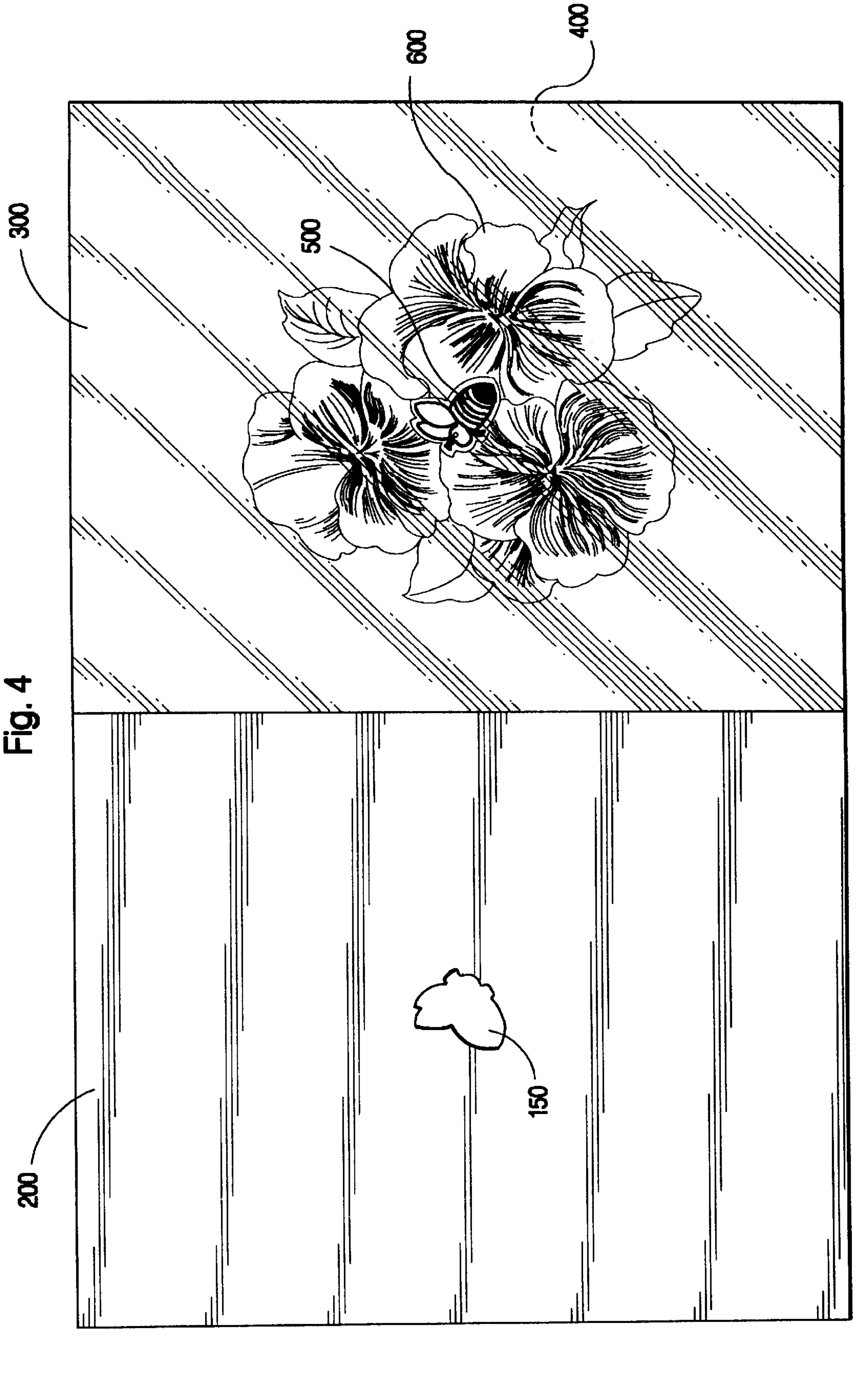
FIG. 4 is a front view of the inside of the card showing non-opaque third and fourth surfaces of the card of the present invention.
Figure 4A:
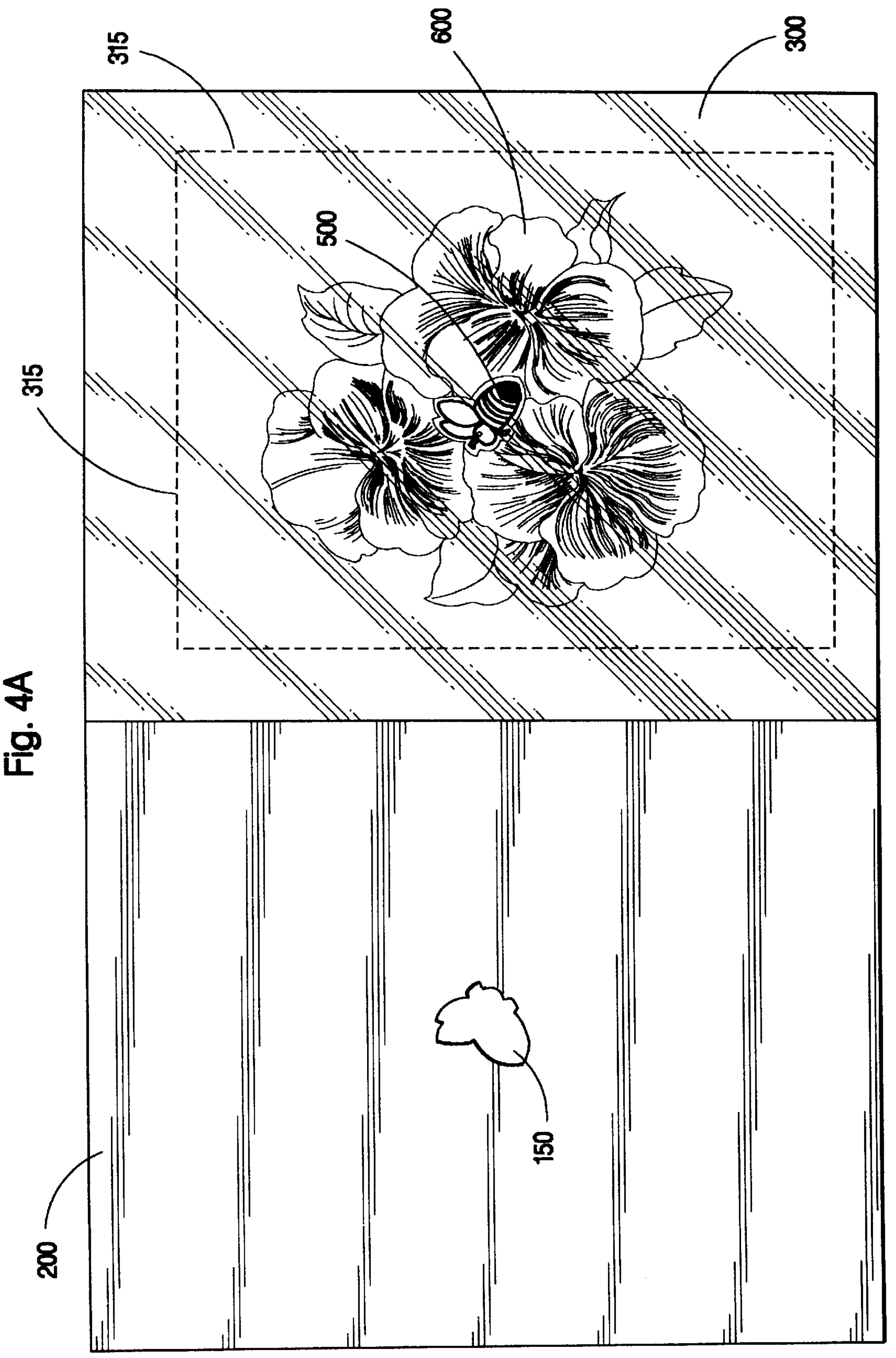
FIG. 4A is an alternative embodiment of the view of FIG. 4 with the addition of placement lines.

The positioning of the information card of the invention against an article of manufacture, such as a garment or the like, in preparation for heat application of the second article 600 is fairly straightforward. The second article 600 will preferably be centered on the fourth surface 400 of the information card, and therefore, the card itself will serve as a positioning and guiding means against a garment or the like. FIG. 4 is a front view of an alternative embodiment of the information card of the invention, shown with non-opaque mounting surfaces 300 and 400 for easier positioning of the second article 600 against a garment or the like. Non-opaque can either mean transparent, semi-transparent, translucent or the like. A purchaser of the card of FIG. 4 might find it useful or desirable, for example, to be able to see the placement of the second article 600, through the third and fourth surfaces 300 and 400, and against a garment or the like. Non-opaque surfaces 300 and 400 would also be desirable if, for example, the first article 500 was removed and positioned on a garment, and it became necessary to view or visualize the subsequent placement of the second article 600 about or around the first article (via the cutout 155) prior to heat application of both articles to a garment or the like. It might also be desirable to have non-opaque card surfaces if the garment or the like has additional indicia that should be avoided or circumvented during the application of the image-bearing articles to such garment, i.e. necessitating precision placement of such articles to such garment. It might also be desirable to have placement lines 315, as shown in FIG. 4A, for the positioning of the card against a garment surface or the like, although placement lines along a non-opaque surface might not be too desirable at times, particularly because the second article 600 would be viewable through the heat application surface prior to heat application of the articles 500 and 600 to the garment.

Figure 5:
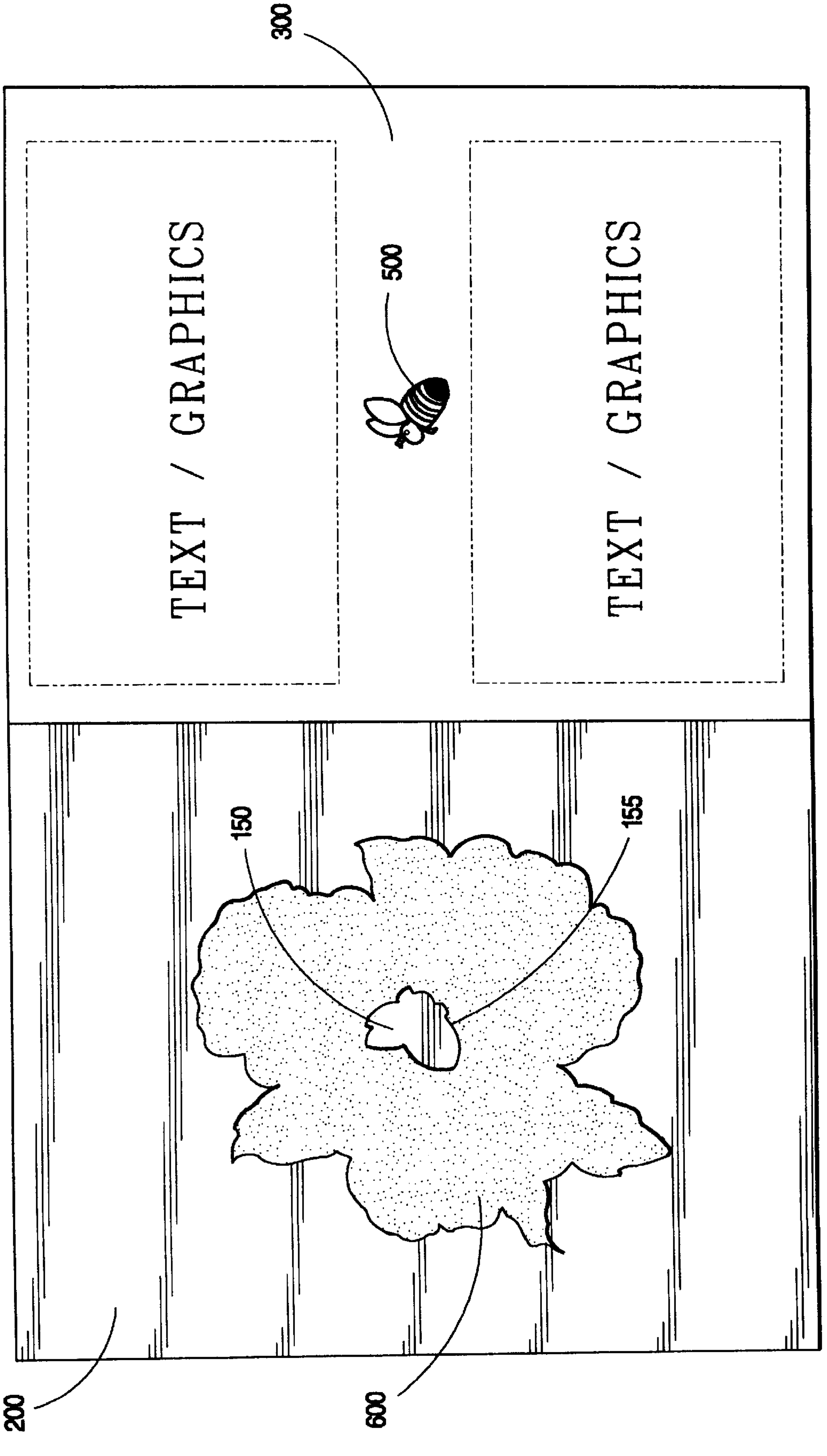
FIG. 5 is a front view of the inside surfaces of the card of the invention showing the second removable article on the second surface.

FIG. 5 is a front view of surfaces 200 and 300 of an alternative embodiment of the information card of the present invention, showing the first article 500 removably attachable to the third surface 500 and the second article 600 removably attachable to the second surface 600 (as opposed to the fourth surface 400 as discussed above). The first surface 100 of the card of FIG. 5 would be unchanged as compared with the embodiments discussed above. Having the second article 600 attached to the second surface 200 as opposed to the fourth surface 400 has one distinct advantage over the embodiments of the invention described in connection with FIGS. 1 through 3, particularly during the heat application of both articles to a garment or the like. Once the first article 500 is removed from the third surface 300 and applied to a garment or the like, the second surface 200 must merely be placed directly over the first article in preparation for heat application to the first surface 100 and through the second surface 200, such that the first article 500 extends through the orifice or cutout 155 in the second article 600 and cutout 150 between the first and second surfaces 100 and 200. Having the first article 500 prepositioned on the garment and extending through the first and second surfaces of the card almost assures that the first article will be heat applied to the garment in proper position with respect to the second article, i.e. with the first article positioned within the cutout 155 of the second article.

One of the disadvantages of having the second article 600 temporarily affixed to the second surface 200, as opposed to the fourth surface 400, is the space taken by the second article 600, which otherwise might have contained written or pictorial descriptions or the like about the subject matter of the card. In other words, if the second article 600 were affixed to the back cover, or fourth surface 400 of the card, there would be more room to include informational material on the inside of the card, or on the second and third surfaces 200 and 300. If the second article 600 were positioned on the inside of the card, it would be possible, although probably not desirable, to have some additional information noted on the back or the fourth surface 400 of the card. However, if the creator of the information card does not require a lot of room, or does not require that there be information noted on the second and third surfaces 200 and 300, but instead only on the third surface 300, then it really doesn't matter that the second article 600 is taking up room on the second surface 200, which might otherwise just be blank.

Another possible disadvantage of having the second article 600 on the second surface 200 with the heat being applied against the first surface 100 and directly against the first article 500 already prepositioned on a garment and peeking through the cutouts 150 and 155, is that the direct topical application of heat against the first article 500 might harm in some manner the outer surface of the first article 500, particularly if such first article is an embroidered patch. Usually, an additional sheet of material is placed between a patch and a direct application of heat from an iron or like, in order to protect the patch from the hot metal or other surface as the case may be. With the embodiment of FIG. 5, it would preferably be necessary to place an additional sheet of material over the first surface 100 prior to the application of heat against such surface in order to protect the first article 500, which would be exposed through the cutouts 150 and 155. One way to overcome this problem, without the need to find or otherwise obtain and use an additional protective sheet, would be to provide a temporary flap of protective material 510 (see FIG. 6) removably attachable to the first surface 100 and covering the entire cutout 150, which flap of material would protect the exposed surface of the first article 500 during the heat application, and which flap of material 510 may then be easily removed from the first surface 100 after the articles have been transferred to the garment 900 or the like. Another way to overcome this problem would be to provide a temporary covering 520 (see FIG. 7) removably attachable to the outer surface of the first article 500, which would protect the first article 500 during the direct heat application to a garment or the like, and would be easily removable by peeling or the like once the first article 500 was heat transferred to the garment. A further method of providing heat protection to the first article 500 would be to use a non-opaque dust cover, as described above, that is sufficiently thick or heat absorbent to also act as a heat shield over the article 500. Of course, if the first article 500 is merely going to be adhesively applied to a separate object, such as a dry flat surface, then it might not be necessary to retain the protective covering 510 or 520 (see FIGS. 6 and 7) for any meaningful period of time, and it can be discarded if the owner of the card does not intend to heat apply such first article 500.

Figure 8:
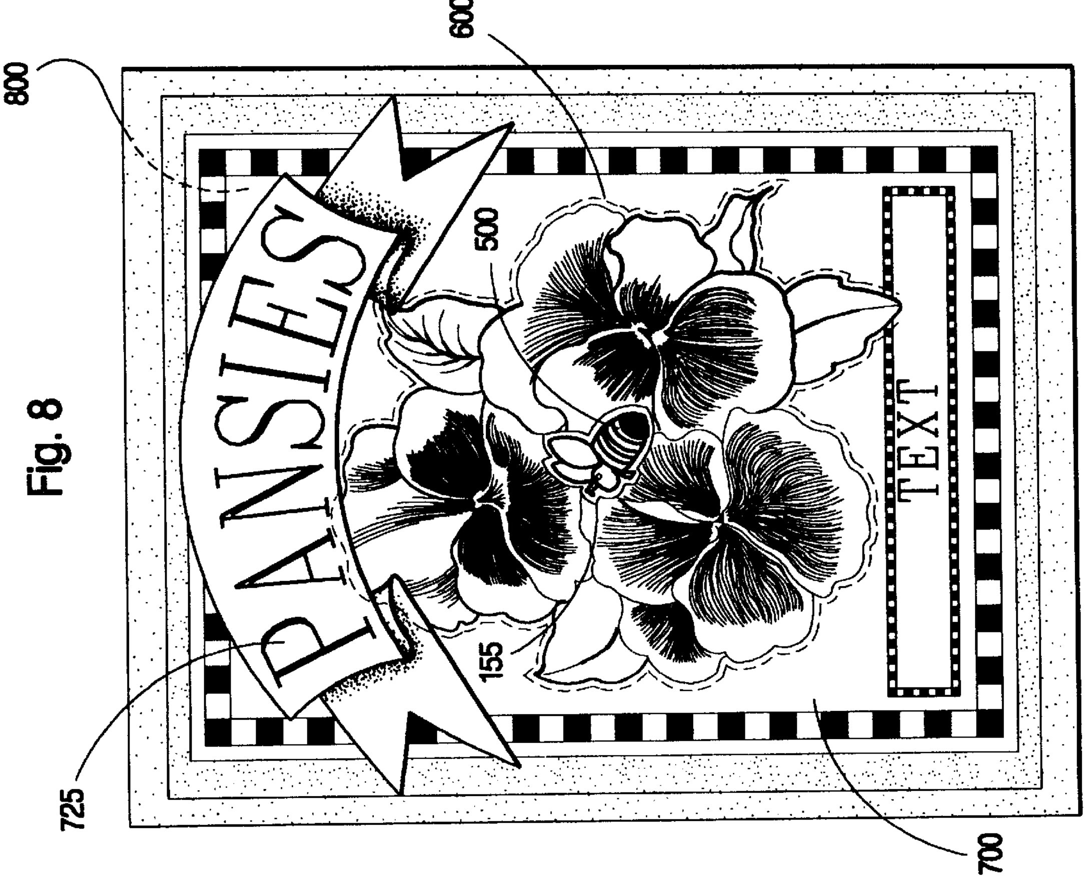

FIG. 8 is a front view of an alternative, two-sided or two-surfaced embodiment of the information card of the present invention, having a first or front surface 700, a second or back surface 800, and indicia or informational material 725 provided on such front surface 700. The second removably attachable article 600 is shown in phantom attached to the second surface 800 in the same manner as previously described above, with a cutout 155 within such second article 600 designed to accommodate the placement of the first removable article 500 during simultaneous heat application of the two articles to a garment or the like. In the two-sided embodiment of the invention of FIG. 8, the first article 500 would be removably attachable to the first surface 700, similar to the manner in which the first article 500 is removably attachable to the third surface 300 of FIGS. 2 and 4. In fact, the two-sided embodiment of FIG. 8 is essentially the same as the four-sided embodiment of FIGS. 1 through 3, for example, but without the first and second surfaces 100 and 200 of FIGS. 1 through 3. However, the first article 500 of FIG. 8 is actually attachable directly to the front cover 700, as opposed to being viewable through a cutout 150 as in FIG. 1.

Figure 6:
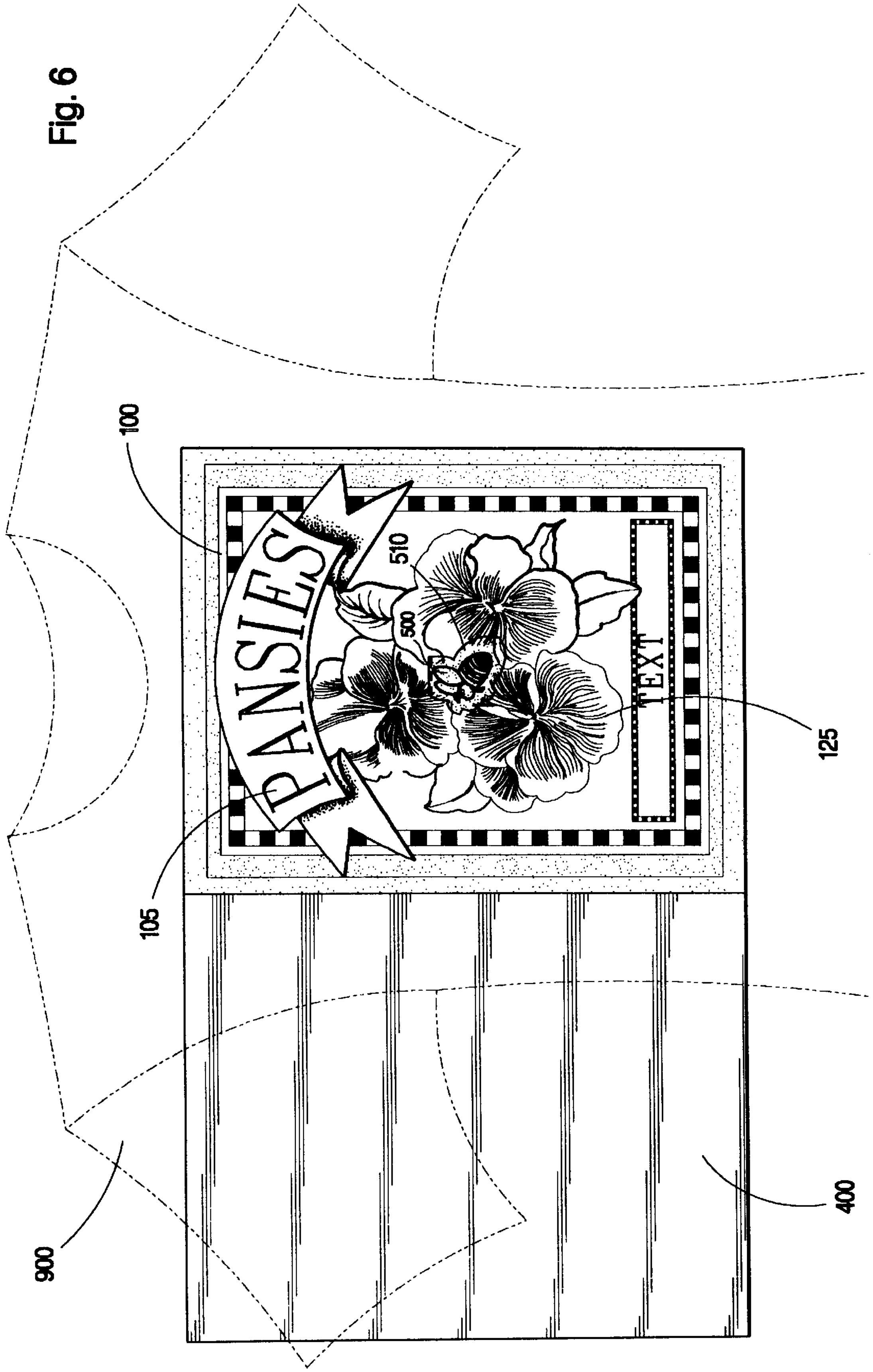
FIG. 6 is a front view showing application of the removable articles to a garment using the front cover of the card as a means of transferring such articles.
Figure 7:
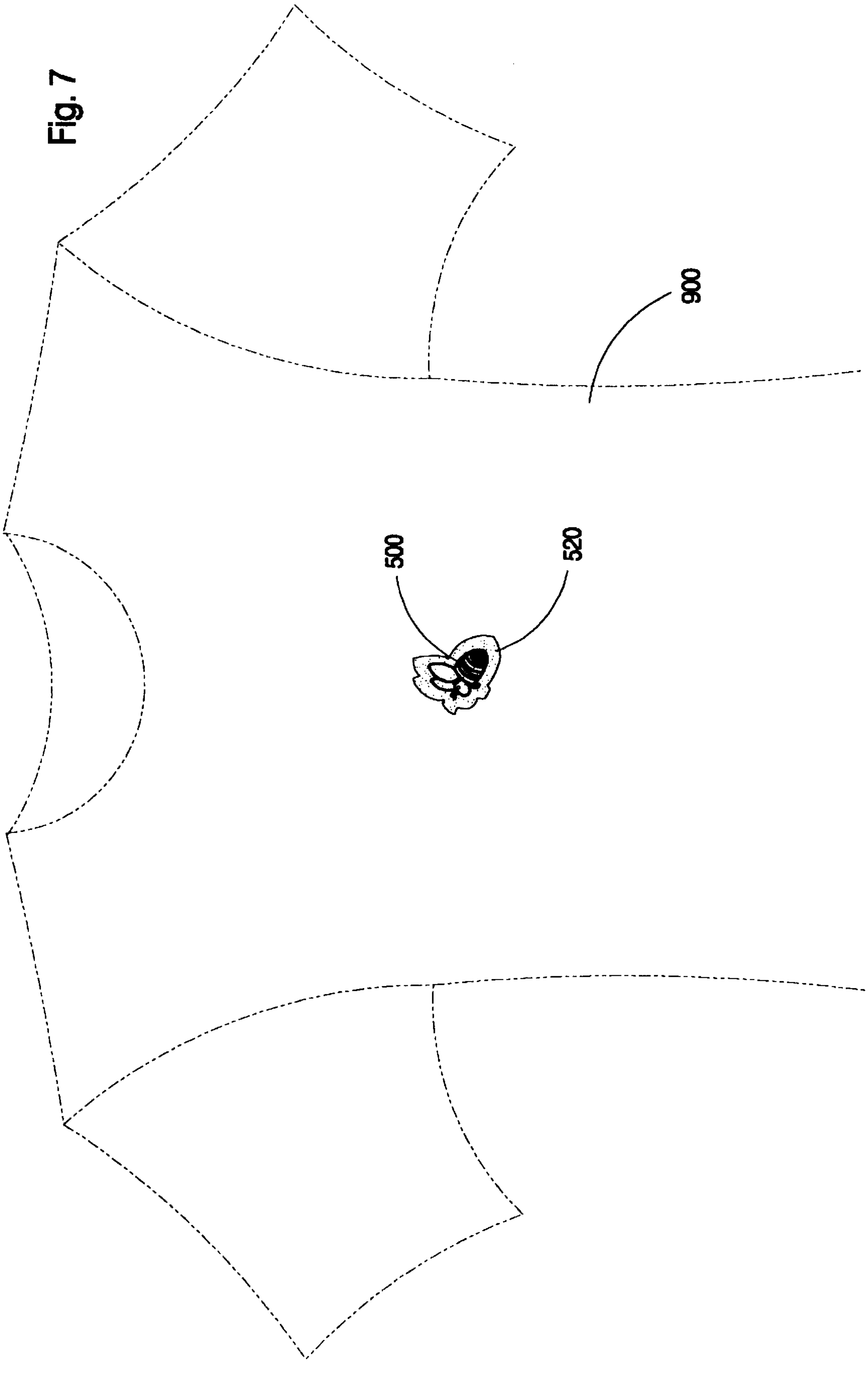
FIG. 7 is a front view of a garment with a first article applied thereto.
Figure 7A:
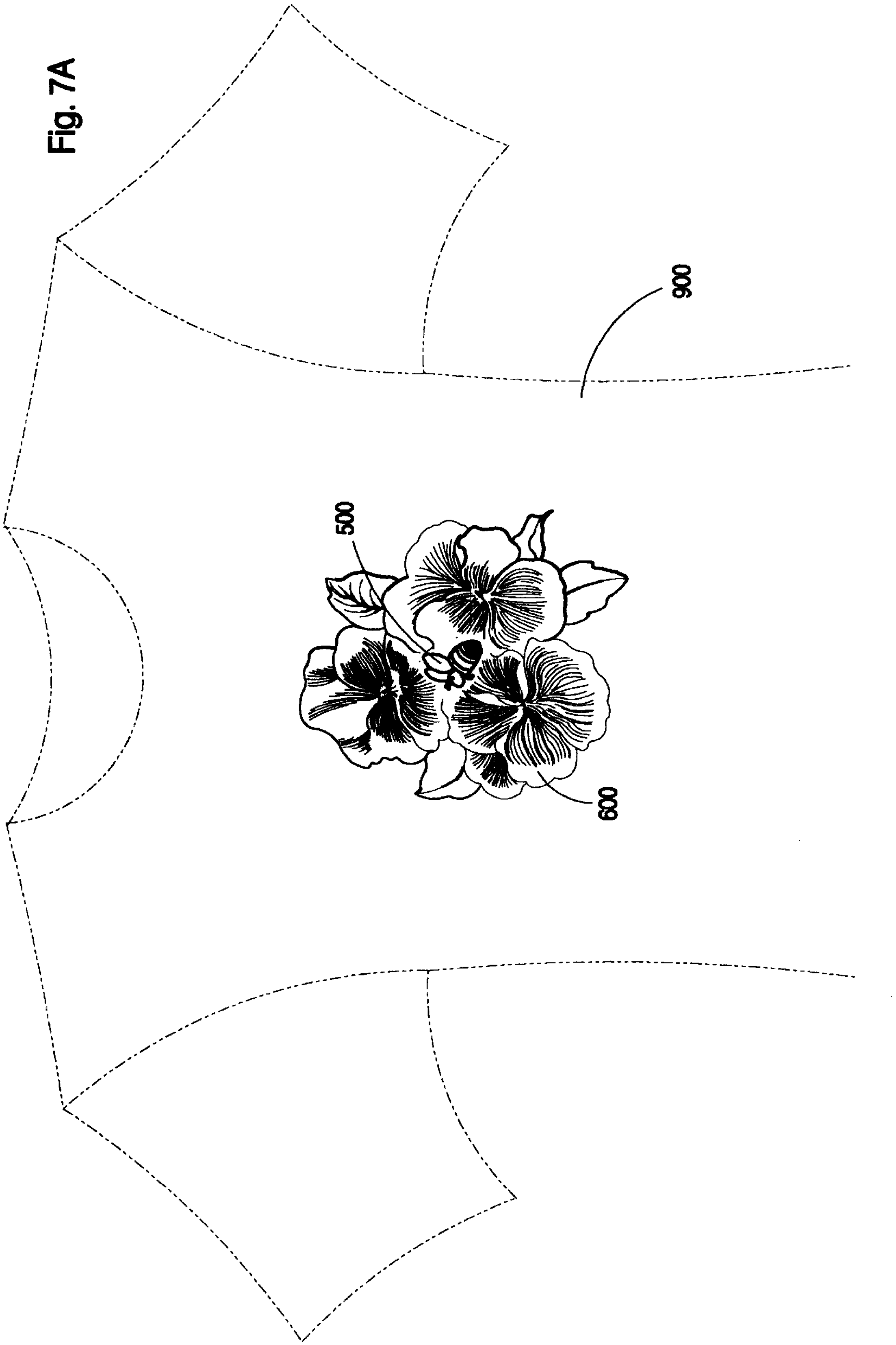
FIG. 7A is a front view of a garment with the first and second articles applied thereto to form a composite image.
Figure 9:
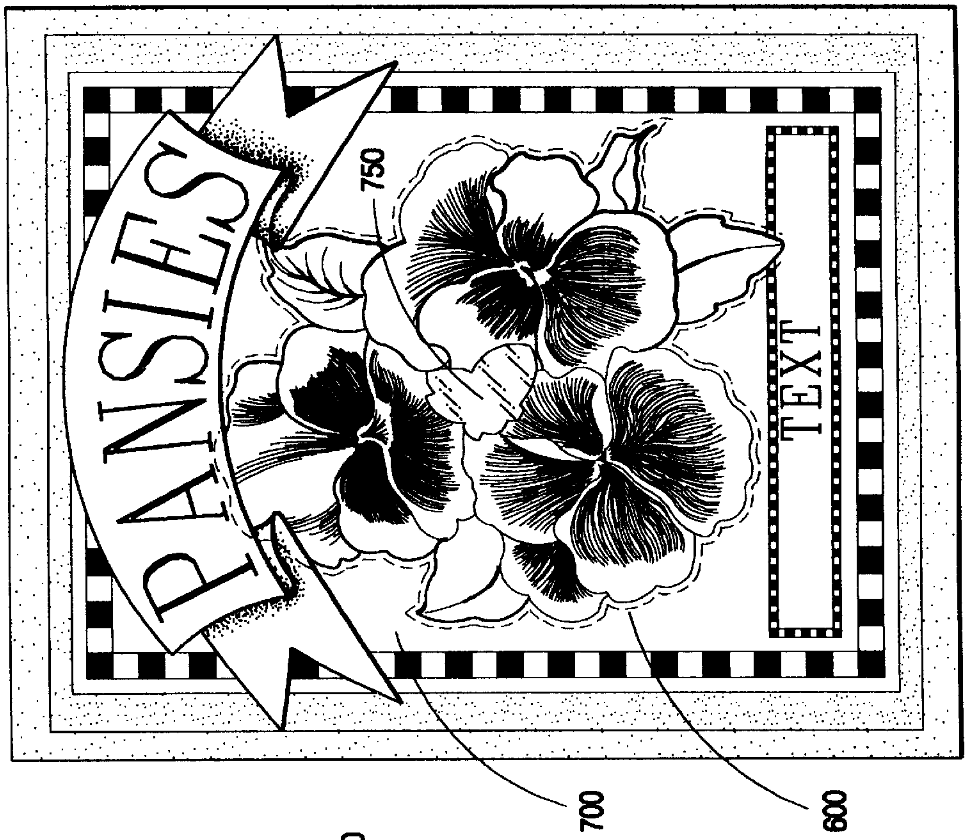
FIGS. 8 through 10 are front views of an alternative, two-sided embodiment of the information card of the present invention.

Since the first article 500 of FIG. 8 is attachable directly to the surface 700, it may be removed directly from such surface 700 and either pressure applied to a separate object, such as a garment, or temporarily pressure applied to a garment in preparation for the heat application of just the first article 500, or the combination of the first and second articles 500 and 600 through the direct application of heat through the front surface 700. As with all of the embodiments discussed herein, the surfaces of the information card may be opaque or non-opaque depending on the desired effect and the desires of the purchasers of such card. If the front surface 700 was completely opaque, then the positioning of the card of FIG. 8 over a prepositioned, pressure applied first article 500, for the heat application of both articles to a garment, would be somewhat difficult. However, if the front surface 700 was non-opaque, or if just the surface 750 directly underneath the first article 500 (see FIG. 9 illustrating the first surface without the first article attached thereto) were non-opaque, the subsequent placement of the card over the prepositioned first article 500, in order to line up the cutout 155 of the second article 600 with the outline or dimension of the prepositioned first article 500, would be much easier, since the first article 500 would be viewable through such non-opaque section 750 of the front surface 700. With the embodiments of FIGS. 8 and 9, the direct application of heat to the first surface 700, with the first and second articles 500 and 600 prepositioned adjacent a garment or the like, is transmitted through the first and second surfaces 700 and 800 for the heat application of the articles 500 and 600 to such garment, and the first surface 700 also protects against the heat problems that might occur with the direct application of heat to the first article 500 (see. FIGS. 6 and 7 and the discussion related thereto).

Figure 10:
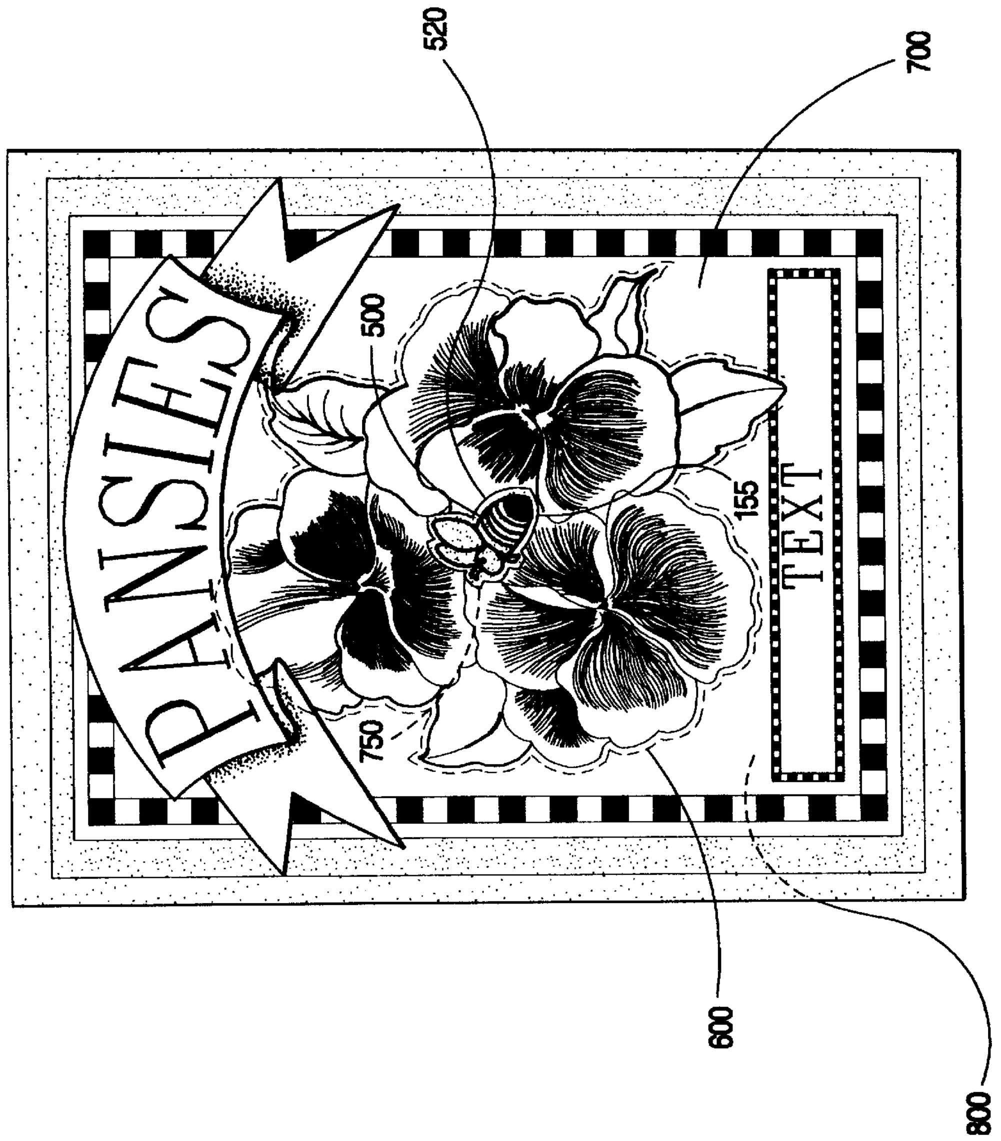

FIG. 10 is a front view of yet another alternative embodiment of the present invention, and more particularly an alternative embodiment of the invention described in FIGS. 8 and 9, showing a two-sided card having a removably attachable protectible layer 520 on the outer surface of the first article 500, allowing for the direct application of heat to the first article 500, and a heat dissolvable undersurface 750 directly under the first article 500 and extending between the first and second surfaces 700 and 800. The heat dissolvable undersurface 750 allows the application of both articles 500 and 600 to a garment or the like without having to first remove and separately preposition the first article 500 on the garment. One would merely position the card of the invention on a textile surface, such as a shirt or other garment, and apply heat directly to the first surface 700 and the protective covering 520 of the first article 500, which heat would dissolve the undersurface 750 and allow for the subsequent heat application of the first article 500 directly to the garment.

Consequently, one could take the card of the invention adorned with informational material and removable articles, and apply such card directly to a garment, and the application of heat to such card would result in a garment adorned with the articles that were originally attached to the card, and a card containing information about a particular subject or experience (no longer having removable articles attached thereto). In other words, if one purchased the informational card of the invention, one would actually be purchasing the ability to create a separate keepsake in the form of a garment or other physical object adorned with heat applied articles, with the informational card serving as the method or means for applying such articles to such a garment. Once the articles are removed from the informational card, if desired, the informational card itself serves as a meaningful keepsake or memento, since it would generally be adorned with interesting information about a particular place, thing or event, with the removable articles being related in some fashion to such information on the card.

Figure 11:
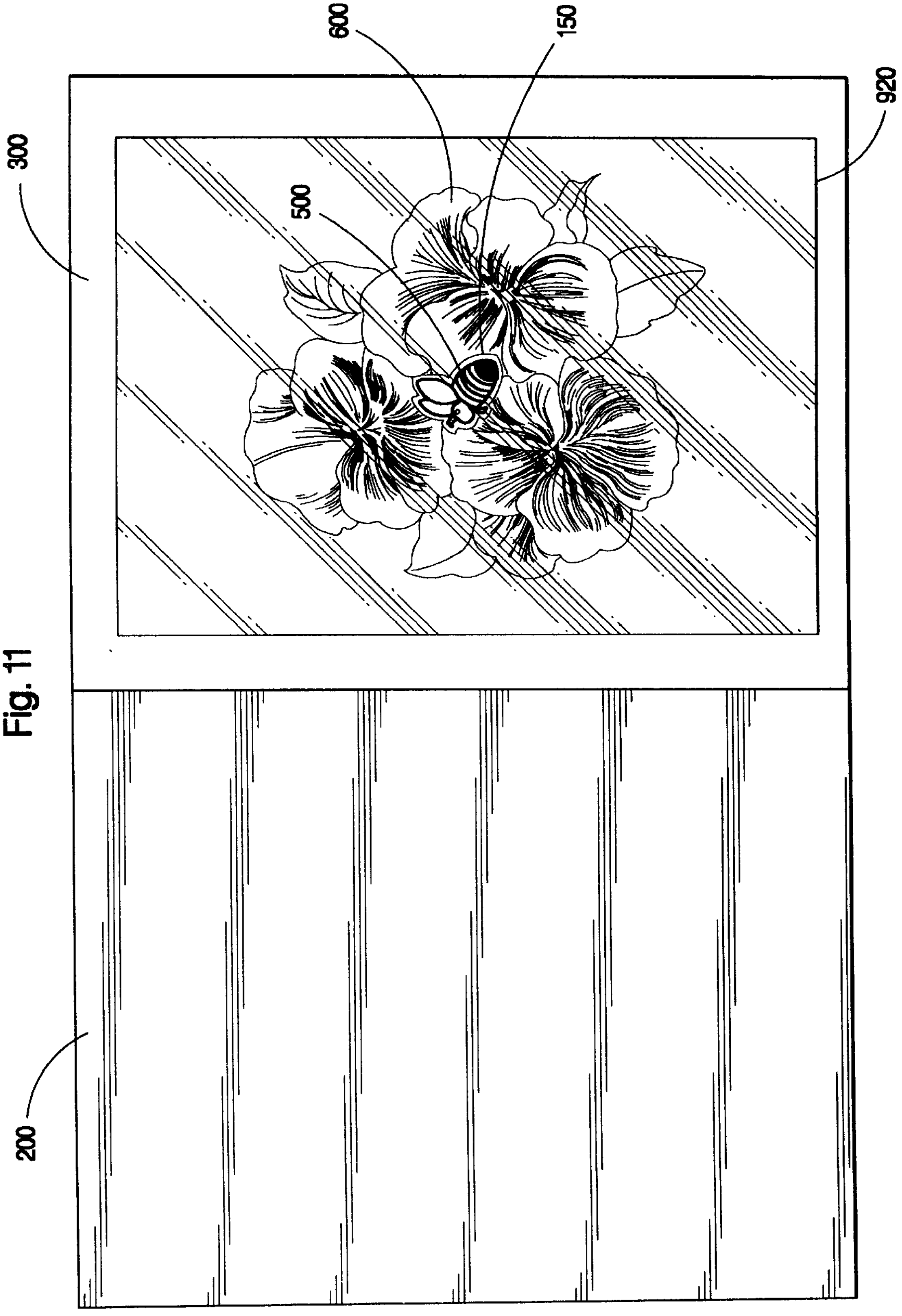
FIG. 11 is a front view of the inside surfaces of an information card showing the second removable article positioned on a separate transfer sheet and inserted loosely between the second and third inside surfaces.
Figure 12:
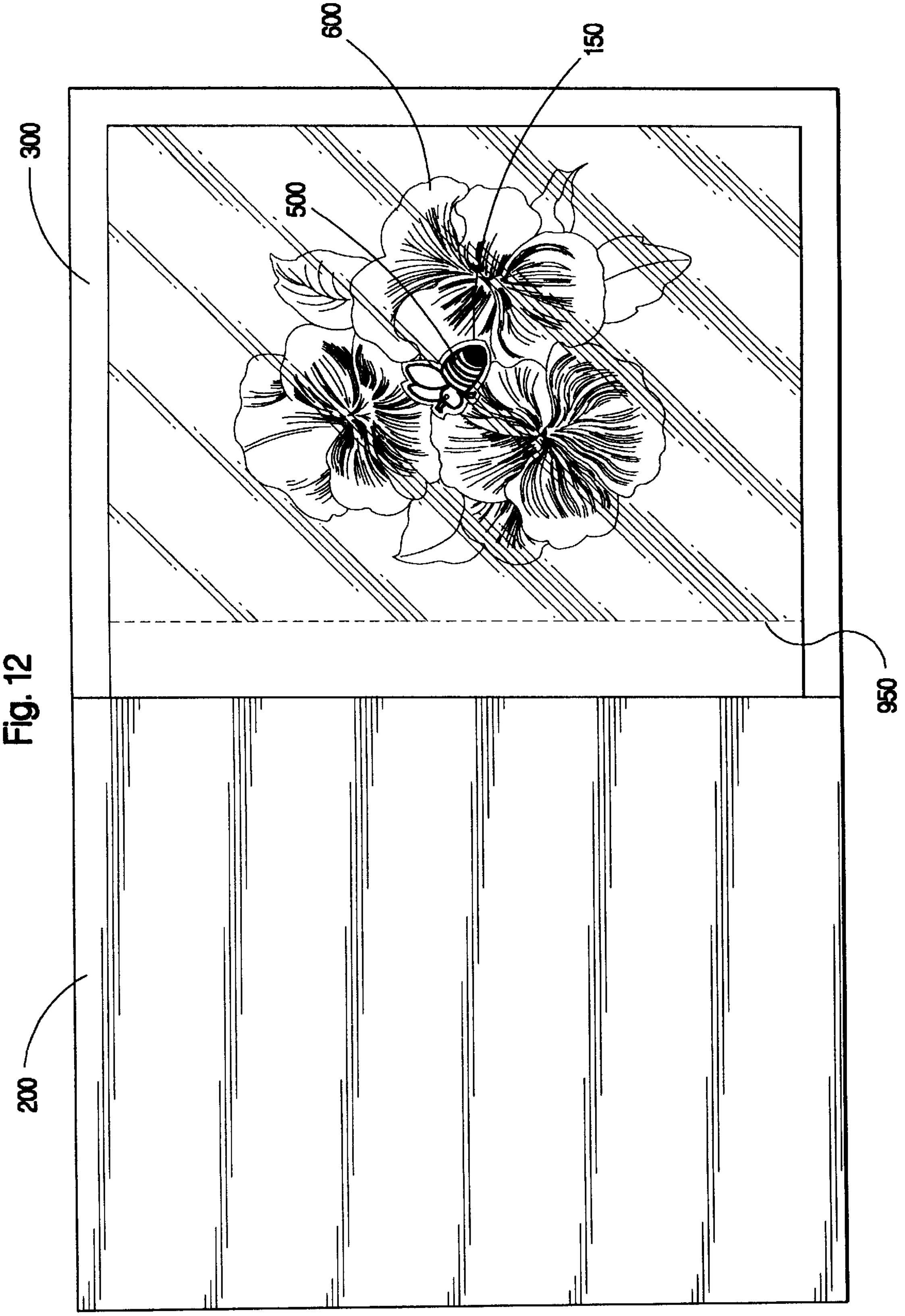
FIG. 12 is a front view of the inside surfaces of an information card showing the second removable article positioned on a separate transfer sheet that is removably attached between the second and third inside surfaces.

The second removable article 600, generally in the form of a heat transfer or the like, is primarily designed for heat application in conjunction with the first removable article 500, generally a patch or the like. The informational card of the present invention could, for example, be vended with the second article loosely removable from the card assembly either as an insert sheet 920 to the card assembly (see FIG. 11), or loosely attached via breakable means 950 or the like (see FIG. 12). In FIG. 12 for example, the second article could be attached to a sheet that is connected to the card assembly via breakable means 950, i.e. a tear line, fold line, perforated line or the like. In any case, the second article 600 should be able to accommodate the positioning of the first article 500 within an orifice or cutout of the second article, and it will understood that while only two removable articles are discussed herein, the information card of the present invention can comprise more than two removable articles, which then, when applied to a garment, or other surface or the like, would create an image that is consistent with the image shown on the informational card.

The present inventor contemplates many uses for the informational card of the present invention. For example, auto dealerships wishing to advertise or solicit business might distribute information cards having information about the dealership printed thereon, accompanied by removable articles related to the dealership logo or the automobiles vended by such dealership. Zoos might distribute or sell informational cards for conveying information about the zoo or a particular animal at the zoo, with removable articles associated with such card and related to the zoo or a particular animal at the zoo. In fact, a zoo could vend many different informational cards having the same information printed thereon, but different removable articles associated therewith, directed to purchasers, for example, that might wish to create a garment each with a different type of animal. School, colleges and universities might sell informational cards with interesting information about the college, as well as removable articles associated therewith, which gives the purchaser the ability to create a personalized garment having school-bearing indicia applied thereto, while retaining the informational card for future reference about that particular school or institution of learning. Other typical uses would include, but would be by no means limited to, tourist attractions and theme parks, concerts and plays, or even manufacturers wishing to distribute information and articles about a new or emerging product.

The informational card of the present invention, therefore, provides a useful tool for disseminating information about a particular person, place, thing or experience, while at the same time enabling recipients of the card to create additional keepsakes or mementos from removable articles attached to the card. The removable articles enhance the overall image of the card, and are designed to interact with each other during the final positioning and attachment to a garment or the like. The card of the invention also allows a recipient to review the final image or design created from the application of such removable articles to a garment or the like, and therefore, provides a means to discriminate between different informational cards. The card itself also provides a tool or the medium for application of the removable articles to a separate object, requiring only that the recipient have an iron or the like, with the card providing all of the other means for fully utilizing and applying the articles to a separate object such as a garment.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. A folded informational card comprising:

a. a first outer surface defining the front of the card and a second outer surface defining the back of the card, b. a first inner surface and a second inner surface, both inner surfaces defining the inside of the card, c. a first article having a first design, the first article being removably attached to the second inner surface of the card and viewable through a cutout between the first outer surface and the first inner surface when the card is folded in the closed position, d. a second article having a second design, the second article being removably attached to one of the first inner surface and the second outer surface and having a cutout within said second article to accommodate the positioning of the first article during the conjunctive application of both articles to a separate object, and e. the front of the card comprising a substantial duplicate of the second design positioned around the cutout within said second article, such that a composite design is formed on the front of the card when the card is folded in the closed position, such composite design being defined by the substantial duplicate of the second design positioned around the first design viewable through the cutout in the first outer surface.

2. A folded informational card in accordance with claim 1 wherein the cutout between the first outer surface and the first inner surface and the first article have a similar shape.

3. A folded informational card in accordance with claim 2 wherein the cutout in the second article and the first article have a similar outer shape.

4. A folded informational card in accordance with claim 3 wherein the first article incorporates on its rear surface means for adhesive heat application to a separate object.

5. A folded informational card in accordance with claim 4 wherein the second article incorporates on its rear surface means for adhesive heat application to a separate object.

6. A folded informational card in accordance with claim 5 wherein the surfaces of the card are heat transmissive so that the second article can be heat applied to a separate object through the application of heat to the surface of the card directly behind the surface on which the second article is removably attached.

7. A folded informational card in accordance with claim 6 further comprising a protective covering positionable over the first article during the heat application of such first article to a separate object.

8. A folded informational card in accordance with claim 7 wherein at least one of the surfaces is non-opaque.

9. A folded informational card in accordance with claim 8 wherein the surface on which the second article is removably attached further comprises placement means for positioning the second article on a separate object.

10. A folded informational card in accordance with claim 5 wherein the first article is an embroidered product.

11. A folded informational card in accordance with claim 10 wherein the second article is a heat transfer.

12. A folded informational card in accordance with claim 11 wherein the second article is removably attached to one of a first and second surface on a separate insert sheet vended with the informational card.

13. A folded informational card in accordance with claim 12 wherein the separate insert sheet is removably attached between the first and second inside surfaces of the informational card.

14. An informational card consisting of at least two surfaces comprising:

a. a first article removably attached to the card and having a first design, such first design being viewable upon a first surface, and b. a second article removably attached to the card and having a second design, such second article being viewable upon a surface other than the first surface and the second design being viewable upon the first surface and surrounding the first design on such first surface, c. the second article incorporating a cutout having the same shape as the first article so when the first article is removed from the informational card and applied to a separate object, the second article may be applied to the same separate object to form a composite image of the second design around the first design identical to the composite image of the second design around the first design viewable along the first surface.

15. An informational card in accordance with claim 14 wherein the first and second articles are applicable to a separate object through the direct application of heat to the first surface of the card.

16. An informational card in accordance with claim 15 wherein at least one of the surfaces of the card are partially non-opaque.

17. An informational card in accordance with claim 15 further comprising a dissolvable surface upon which is removably attached the first article.

18. A novelty card incorporating viewable material transferrable to other objects comprising:

a. a first leaf having first and second opposite surfaces on opposite sides, b. a second leaf having first and second opposite surfaces on opposite sides, c. the first and second leaves being at least temporarily foldable together with the second surface of the first leaf abutted against the first surface of the second leaf, d. a partial opening in the first leaf, e. a removable product temporarily secured to the first surface of the second leaf opposite to and viewable through the partial opening in the first leaf when the two leaves are abutting, and f. a transferrable design positioned on a surface other than the first surface of the second leaf, g. the removable product and transferrable design being related to each other by subject matter.

19. A novelty card in accordance with claim 18 wherein the transferrable design and removable product are separately removable and applicable to the surfaces of other objects.

20. A novelty card in accordance with claim 19 wherein the transferrable design and removable product are related to each other such that the transferrable design may be used as a design at least partially about the removable product upon the surface of another object.

21. A novelty card in accordance with claim 20 wherein the transferrable design comprises a removable material having an image thereupon transferrable to another object.

22. A novelty card in accordance with claim 20 wherein the transferrable design comprises an image formed of pigment materials separately transferrable to another object.

23. A novelty card in accordance with claim 22 wherein the pigment material is originally printed directly on the surface on which is positioned the transferrable design in a mirror image of the final transferred design.

24. A novelty card in accordance with claim 23 wherein the transferrable design is provided with a central portion within which the removable product may be positioned.

25. A novelty card in accordance with claim 24 in which the removable product is provided with adhesive means for attachment to the central portion of the transferrable design.

26. A novelty card in accordance with claim 25 wherein the removable product is an embroidered product.

27. A novelty card in accordance with claim 26 wherein the removable product is mounted in the card such that it can be transferred to another object directly in the central portion of the transferrable design by being heat applied in a single application of heat and pressure to the surface of the card on which is positioned such removable product.

28. A novelty card in accordance with claim 22 wherein there is on the first surface of the first leaf a representation surrounding the partial opening in the first leaf of the transferrable design in its ultimate transferred form.

* * * * *